United States Patent [19]

Wing et al.

[11] Patent Number: 4,657,790
[45] Date of Patent: Apr. 14, 1987

[54] POLYURETHANE BACKED CARPET

[75] Inventors: Phillip L. Wing, Cohutta; James K. Jennings, Rocky Face; Terry L. Lamb, Ringgold, all of Ga.

[73] Assignee: The Dow Chemical Company, Midland, Mich.

[21] Appl. No.: 752,868

[22] Filed: Jul. 8, 1985

[51] Int. Cl.⁴ ............................................. B05D 3/02
[52] U.S. Cl. .............................. 427/374.1; 427/389.9; 427/394; 427/412; 428/95
[58] Field of Search ............ 428/95; 427/374.1, 389.9, 427/394, 412

[56] References Cited

U.S. PATENT DOCUMENTS

| 4,016,318 | 4/1977 | DiGioia et al. | 428/95 |
| 4,078,100 | 3/1978 | Doerfling | 428/95 |
| 4,171,395 | 10/1979 | Tillotson | 428/95 |
| 4,296,159 | 10/1981 | Jenkines et al. | 428/95 |

Primary Examiner—Marion C. McCamish
Attorney, Agent, or Firm—G. C. Cohn

[57] ABSTRACT

A process for preparing a substrate backed with a polymer derived from an organic polyisocyanate, said process comprising the steps of
(a) forming a precoat layer of a precoat reaction mixture comprising a substantially difunctional polyahl and a substantially difunctional organic polyisocyanate,
(b) separately forming a capcoat layer of a capcoat reaction mixture comprising a polyahl and a polyisocyanate,
(c) contacting said precoat layer with one surface of said substrate before said precoat layer is cured to a tack-free state,
(d) contacting said capcoat layer with one surface of said precoat layer before at least one of said precoat layer and capcoat layer is cured to a tack-free state,
(e) completing curing said capcoat and precoat layer, and
(f) cooling the resulting polymer-backed substrate to a temperature less than about 35° C. before any mechanical distortion thereof, wherein steps (a)–(f) are carried out under conditions such that mechanically induced stress in the substrate, precoat layer and capcoat layer is minimized.

Another aspect of this invention is a polymer backed-substrate comprising (a) a substrate (b) attached to a surface of said substrate a precoat layer of a polymer formed by the reaction of a substantially difunctional polyahl and a substantially difunctional organic polyisocyanate, which precoat layer is overcoated with (c) a capcoat layer comprising a polymer formed by the reaction of a polyahl and an organic polyisocyanate.

18 Claims, 3 Drawing Figures

POLYURETHANE BACKED CARPET

BACKGROUND OF THE INVENTION

This invention relates to a method for applying to a substrate a backing of a polymer derived from an organic polyisocyanate. More particularly, this invention relates to a method for preparing textiles backed with a polyurethane and/or polyurea polymer.

In the production of textiles, it is often desirable to provide the textile with a polymeric backing. The backing is useful for several purposes. It provides dimensional stability to the textile. It provides a cushion to the underside of the textile, thereby reducing or eliminating the need to use a separate padding when installing the textile. The backing often locks the fibers of the textile, particularly tufted or woven fibers, to a primary backing fabric. The backing also reduces wear on the primary backing fabric caused by contact with the underlayment and reduces the sliding of the textile over the underlayment during use.

The backing is particularly important in making modular carpet tiles. When such carpet tiles are installed, the adjacent tiles must fit together snugly so that the appearance of seams is negligible. This means that the modular carpet tiles must be highly dimensionally stable and that they lay flat on the floor without curling or otherwise becoming distorted.

Heretofore, the required dimensional stability was achieved by the use of a stabilizing scrim in the backing. Such scrim is typically a non-woven fiberglass mat which is embedded between two layers of a polymeric matrix. See, for example, U.S. Pat. No. 4,010,301 to Anderson et al. Although such scrim provides good dimensional stability, its use often makes the manufacture of the polymer backed textile more difficult and expensive. In addition, it is always of interest to improve the dimensional stability of the backed textile either with or without a scrim. It would therefore be desirable to provide a polymer-backed textile which is dimensionally stable without using such a scrim, and to improve the dimensional stability of a backed textile carpet containing a scrim.

SUMMARY OF THE INVENTION

This invention is a process for preparing a substrate backed with a polymer derived from an organic polyisocyanate, said process comprising the steps of (a) forming a precoat layer of a precoat reaction mixture comprising a curable linear polymer-forming compositive, (b) separately forming a capcoat layer of a capcoat reaction mixture comprising a curable polymer forming composition, (c) contacting said precoat layer with one surface of said substrate before said precoat layer is cured to a tack-free state, (d) contacting said capcoat layer with one surface of said precoat layer before at least one of said precoat layer and capcoat layer is cured to a tack-free state, (e) completing curing said capcoat and precoat layer, and (f) cooling the resulting polymer-backed substrate to a temperature less than about 35° C. before any mechanical distortion thereof, wherein steps (a)–(f) are carried out under conditions such that mechanically induced stress in the substrate, precoat layer and capcoat layer is minimized.

The process of this invention provides a method by which a highly dimensionally stable polymerbacked substrate can be formed with or without the use of a scrim. When the substrate is a carpet, the polymer-backed carpet of this invention is highly dimensionally stable and can be used as a modular carpet tile or in other carpet forms in which high dimensional stability is desirable.

DETAILED DESCRIPTION OF THE INVENTION

Figure 1:
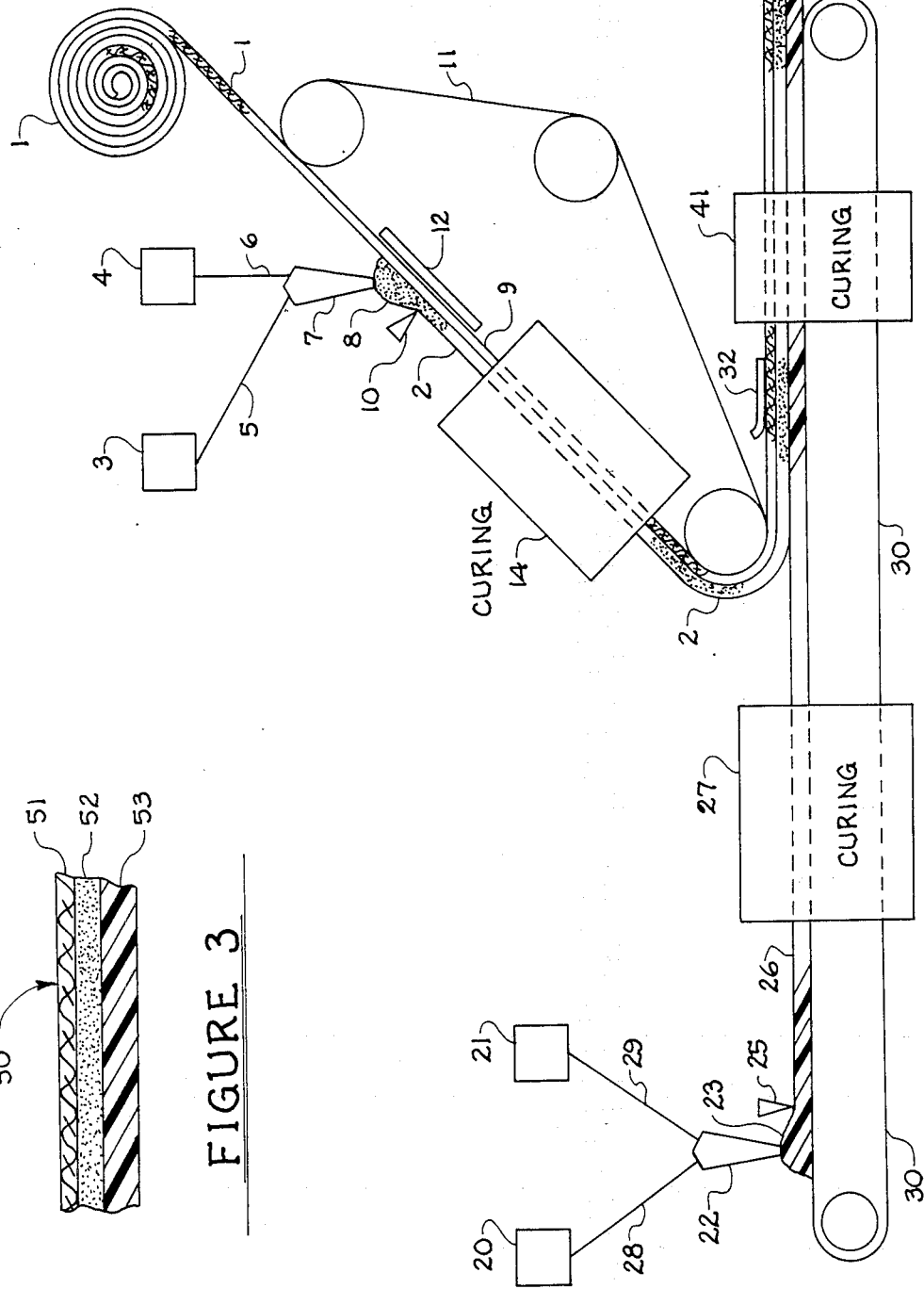
FIGS. 1 and 2 are schematic diagrams of embodiments of the process of this invention.

The substrate employed herein can be any to which a polymer backing is advantageously applied. Preferably, however, the substrate is a textile and the textile is most preferably a carpet. The textile advantageously comprises a primary backing material having a pile attached thereto, but other textile types such as fusion bonded carpet are also useful. When the textile contains a primary backing, it may be woven or non-woven. However, better dimensional stability is often achieved with a non-woven primary. In addition, non-woven primaries tend to be more thermally stable, and therefore provide flatter products.

To one surface of the substrate is bonded a precoat layer which is the reaction product of a reaction mixture comprising a curable linear polymer-forming composition. Said composition can be any composition which cures to form a linear polymer. The preferred composition comprises a substantially difunctional polyahl or an organic polyisocyanate. The term "polyahl" as used herein refers to a compound having at least two active hydrogen atoms which, because of their position in the molecule, display significant activity according to the Zerewitnoff test described by Kohler in the Journal of Americal Chemical Society, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polymercaptans and polyacids. In general, polyols and polyamines are preferred. Polyols are most preferred.

Suitable polyols include polyether polyols, polyester polyols, polyhydroxyl-containing phosphorous compounds, hydroxyl-terminated amines and polyamines, the corresponding amine-terminated polyether and/or polyester polyols, the so-called polymer or copolymer polyols which comprise a dispersion of polymer particles in a continuous polyol phase, as well as other active hydrogen containing compounds which are known to be useful in the preparation of polyurethane polymers. Examples of these and other suitable polyols are described in U.S. Pat. No. 4,394,491, particularly in columns 3–5 thereof. Suitable copolymer polyols include those described in U.S. Pat. No. 4,394,491.

The polyahl employed in the precoat layer is substantially difunctional. By "substantially difunctional" it is meant that the major portion of the polyahl comprises compounds having two active hydrogen atoms. Although minor amounts of tri- or higher functional polyahls may be employed, it is preferred that the polyahls have a average functionality of about 1.8–2.3, and more preferably about 1.8–2.1 when no scrim is used. Such difunctional polyahls give rise to a substantially linear polymer when reacted with an organic polyisocyanate.

Most preferably, said polyahl contains a major proportion of a relatively high equivalent weight diol (i.e. 250–5000 equivalent weight) and a minor proportion of a relatively low equivalent weight diol (i.e. 25–250 equivalent weight).

The precoat reaction mixture further comprises an organic polyisocyanate. As with the polyahl, a substantially difunctional polyisocyanate is preferred herein, since those materials give rise to more linear polymers. However, a polyisocyanate having an average functionality of up to about 2.7 may be used herein, especially if a stabilizing scrim is used. Preferably, the functionality of the polyisocyanate is about 1.8–2.3, particularly if no scrim is used.

Aliphatic polyisocyanates such as hexamethylene diisocyanate, hydrogenated diphenyl methane diisocyanate, cyclohexane 1,4-diisocyanate, tetramethylxylene diisocyanate and isophorone diisocyanate are useful herein.

Preferred, however, are aromatic polyisocyanates, especially toluene diisocyanate and diisocyanatodiphenyl methane or its polymer derivatives. An isocyanate index of about 95–140, preferably 105–120, is generally used herein. A higher index may result in edge curling and a lower index results in incomplete curing of the polymer. The "isocyanate index" is 100 times the ratio of isocyanate groups to active hydrogen atoms in the reaction mixture.

It is often preferred to form a prepolymer from the polyisocyanate and less than a stoichiometric amount of the polyahl. This prepolymer is then reacted with the remainder of the polyahl in conventional manner. Preferably, the prepolymer is prepared with a low molecular weight diol.

In addition to the polyahl and polyisocyanate, the precoat reaction mixture advantageously and preferably contains an inorganic filler. Suitable such fillers include, for example, carbon black, titanium dioxide, calcium carbonate, aluminum trihydrite, mica and the like. The precoat reaction mixture advantageously contains from about 0 to 500, preferably 150 to 300 parts by weight of inorganic filler per 100 parts polyahl. Mixtures of calcium carbonate and aluminum trihydride, especially about 1:1 mixtures thereof, are preferred.

In addition, the precoat reaction mixture also advantageously contains a catalyst for the reaction of the polyahl and the polyisocyanate, surfactants, antioxidants, pigments, flame retardants, antistatic agents, reinforcing fibers, stiffening resins and other conventional additives useful in preparing polymers from organic polyisocyanates. In addition, the reaction mixture may contain a blowing agent such as water, a low boiling halogenated hydrocarbon and the like, or may be frothed according to the process described, for example in U.S. Pat. No. 3,821,130, to form a lower density backing.

Preferably, the precoat reaction mixture is applied to the substrate and spread thereover, forming a thin layer on the substrate. The temperature of application is advantageously from about 45°–90° F. Higher temperatures tend to cause the reactants to react too rapidly, and at lower temperatures the viscosity of the reaction mixture is frequently too high to deliver acceptably.

The precoat reaction mixture is formed into a layer of desired thickness. Such layer may be formed directly on the substrate, on a previously formed capcoat layer, or as a free-standing layer on a suitable support. In those instances when the precoat reaction mixture is not formed into a layer directly on the substrate, it is contacted with the substrate before the precoat layer is cured to a tack-free state. If curing of the precoat layer has progressed to a tack free state when contact with the substrate is made, inadequate bonding of the precoat layer to the substrate is seen.

Any suitable apparatus for applying and spreading the precoat reaction mixture onto the substrate can be used but a doctor blade is preferred. Preferably, an excess of the precoat reaction mixture is applied to the substrate and the doctor blade is used to effect penetration of the reaction mixture into the substrate, to control the thickness of the film and to form a coating of uniform thickness. The coating weight of the precoat layer is advantageously about 5 to 65 oz/yd$^2$, preferably 10 to 40 oz/yd$^2$.

When the precoat layer is formed directly on the substrate, the conditions used in the application slip are preferably chosen such that the precoat reaction mixture does not react sufficiently to substantially increase its viscosity until after the substrate is coated.

After the precoat reaction mixture is formed into a layer of desired thickness, it is cured to form a precoat layer. Curing is generally affected by heating the precoat reaction mixture to about 100° to about 300° F. (38°–149° C.), preferably 200° to 270° F. (93°–132° C.). The time required to effect the curing will depend on the amount of the catalyst employed, the temperature of the cure, the thickness of the precoat and like factors. Generally, however, said conditions are chosen so that said curing is effected in a relatively short period, i.e. 5–20 minutes. However, curing to a tack-free state is not effected until after the precoat layer is attached to the substrate. Furthermore, if desired, only partial curing of the precoat reaction mixture, i.e. sufficient to provide a polymer sufficiently viscous that it holds its shape during subsequent steps, may be conducted. Complete curing can then be effected after application and lamination of all layers as described hereinafter.

Normally, the precoat reaction mixture is applied to the substrate at one place and the coated substrate is removed to an oven for curing. Such movement, when present, is advantageously conducted under conditions such that mechanically induced stress in the coated substrate is minimized. In general, this requires the transport and handling of the precoated substrate while keeping the substrate essentially flat. Transport of the coated substrate can be achieved with a tenter mechanism and a series of rollers but is preferably done using a conveyor belt.

The capcoat is formed separately from a capcoat reaction mixture comprising a curable polymer forming composition. Preferred polymer forming compositions comprise a polyahl having an average functionality between about 1.8 and 3, preferably about 1.8–2.1, and an organic polyisocyanate.

The polyahl employed is as described with respect to the precoat reaction mixture except that a somewhat greater amount of tri- or higher functional polyahls may be employed. Generally, a mixture of difunctional polyahls and a trifunctional polyahl is employed. Preferably, the polyahl also contains also at least one relatively high equivalent weight polyahl (250 to 10,000 equivlent weight) and a relatively low equivalent weight polyahl (25 to 250 molecular weight). More preferably, the high molecular weight component is a mixture comprising a difunctional polyahl and a trifunctional polyahl. Likewise, the low molecular weight component may comprise a mixture of di- and trifunctional polyahls.

The polyisocyanate employed is as described with respect with the precoat reaction mixture. An index of 70 to 160, preferably 90 to 120 is used. Operation outside of these limits tends to provide an undercured capcoat or a backing which tends to distort upon standing.

The capcoat reaction mixture advantageously contains from about 0–500, preferably 100–250 parts by weight of fillers and/or pigments per 100 parts of polyahl. In addition, the water content of the capcoat reaction mixture is preferably below 0.5% by weight when a non-cellular capcoat is desired. Antioxidants and other conventional additives can be employed in the capcoat reaction mixture.

The polyahl or polyahl mixture is mixed with the polyisocyanate and formed into a capcoat layer. Mixing is advantageously done with the polyahl component at a temperature of about 15°–95° F. and the polyisocyanate at a temperature of about 50°–90° F., preferably 70°–80° F. At lower temperatures the polyisocyanate may be solid, and at higher temperatures the polyahl mixture may react with the polyisocyanate too rapidly or prematurely. The capcoat reaction mixture thus formed is shaped into a capcoat layer of desired thickness. Advantageously, the capcoat layer is formed on a conveyor belt using a knife coating mechanism to spread the capcoat reaction mixture and gauge it to desired thickness. The capcoat advantageously has a weight of about 20 to 100, preferably about 30–70 oz-/yd$^2$.

The capcoat layer is then partially or fully cured by heating at an elevated temperature (100 to 350, preferably 200° to 275° F.). However the contacting of the precoat and capcoat layers is done before both of said layers have been cured to a tack-free state. In a preferred embodiment, curing of the capcoat is continued until the capcoat is sufficently cured to maintain its shape and dimensions during subsequent handling, and the partially cured capcoat is laminated to the precoat layer of the precoated substrate. Generally such curing is evidenced by a polymer viscosity of at least 100,000 cps. Care must be taken, however, to avoid complete curing of the capcoat at this stage. Adaquate coating is further evidenced by the formation of "strings" when a metal is contacted with a partially cured capcoat and then pulled away.

Because at least one of the layers is not fully cured upon contacting the layers together, lamination is easily achieved merely by bringing the respective layers together under sufficient pressure to form a satisfactory bond. Advantageously, the lamination of the precoat layer to the capcoat takes place under a foam blanket or other means by which a consistent gauge film is prepared.

The lamination of the substrate, precoat and capcoat layers can take place in any order desired. For example, it is possible to first apply the precoat reaction mixture to the substrate and cure it, and independently form an uncured or partially cured capcoat layer and then laminate it to the precoated substrate. However, it is equally possible to apply the precoat reaction mixture to a preformed and precured capcoat layer, and then attach the substrate before the precoat layer is completely cured.

All that is required in laminating the layers together is that the precoat layer is attached to the substrate before the precoat layer is cured to a tack-free state, and the precoat and capcoat layers are attached before both are cured to a tack-free state.

Simultaneous with or after lamination of the layers, curing of the uncured layer(s) is finished. Following the final curing of the polymer layer, the polymer backed substrate is cooled to a temperature less than 100° F., preferably about 50° to 90° F., before rolling up or otherwise mechanically distorting the backed substrate. Such coating minimizes mechanical stress during roll up which may later lead to reduced dimensional stability of the backed substrate.

Although not required, a scrim may be employed in the process of this invention to add further dimensional stability to the polymer-backed substrate. Suitable scrims include non woven fiberglass mats, polyethylene mats, polypropylene mats, polyester mats, and the like. Glass flakes and fibers are also suitable. When employed, said scrim is advantageously inserted between the substrate and the precoat layer or, preferably, between the precoat layer and the capcoat. In applying the scrim, the scrim is impregnated by one or both of the precoat and capcoat layer.

Figure 2:
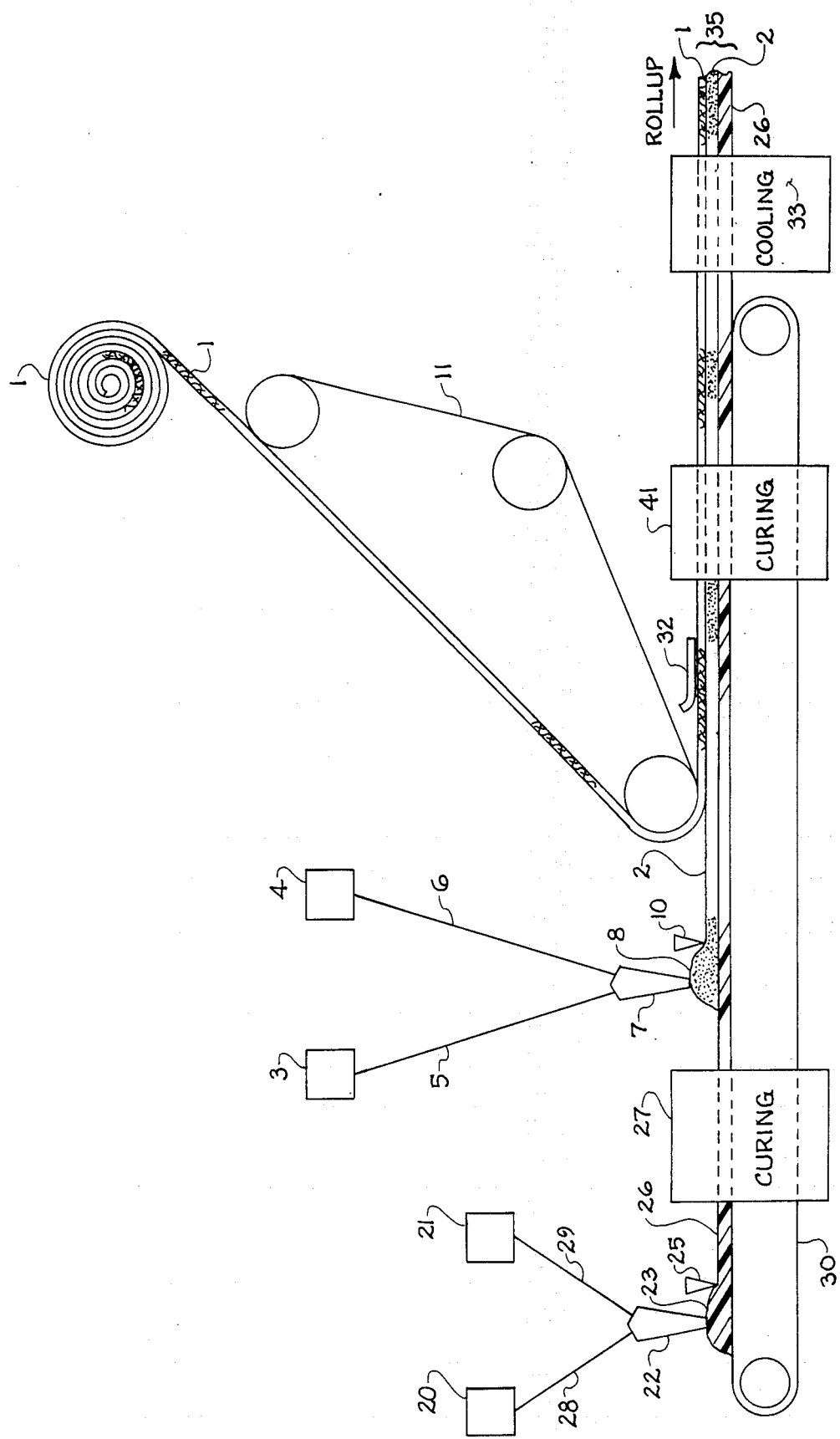

In FIGS. 1 and 2, a urethane reaction mixture dispensing head 7 is provided in which the "A-side" (polyisocyanate), and "B-side" (polyol) components are mixed and applied to the substrate 1 (FIG. 1) or to the capcoat (FIG. 2). The A-side component is stored in vessel 3 and delivered through conduit 5 to mixing head 7. Similarly, the B-side component is stored in vessel 4 and delivered through conduit 6 to mixing head 7. Typically, either the conduits 5 and 6 or the mixing head 7 are equipped with metering equipment to insure delivery of the A- and B-side components in proper proportions.

In FIGS. 1 and 2, a capcoat is prepared by depositing a capcoat urethane reaction mixture 23 onto a conveyer belt 30 or similar device via a capcoat mixing head 22. The A-side component for this capcoat reaction mixture 23 is stored in vessel 20 and delivered through conduit 28 to capcoat mixing head 22. Similarly, the B-side component is stored in vessel 21 and delivered through conduit 29 to the capcoat mixing head 22. Conduits 28 and 29 and/or capcoat mixing head 22 are typically equipped with metering devices to insure delivery of the A- and B-side components in proper proportions.

The conveyor belt 30 is advantageously made of a material to which the partially cured capcoat does not significantly adhere, or is coated with such a material prior to forming the capcoat thereon. Preferably, the conveyor belt 30 is composed of or coated with a wax or a non-sticking polymer such as polytetrafluoroethane (PTFE) or a latex. Generally, materials which are known as mold release agents for preparing molded polyurethane articles are useful herein to coat the conveyor belt.

The capcoat reaction mixture 23 is formed into a capcoat layer 26 by passing the conveyor belt 30 containing the capcoat reaction mixture 23 under a knife cutter 25, doctor blade or other conventional apparatus for providing a polymer film of a desired thickness. The knife cutter 25 and/or conveyor belt 30 are advantageously adjustable so that the capcoat layer 26 is of a desired thickness.

The conveyor belt 30 carrying the capcoat layer 26 is passed through a heating zone 27 wherein the capcoat layer 26 is sufficently cured that it can be handled as a solid layer in subsequent process steps. The capcoat may be completely cured in heating zone 27 if the precoat layer is not cured to a tack-free state upon lamination of the precoat to the capcoat. In FIG. 1 an embodiment is shown wherein the capcoat layer is only partially cured. In the embodiment shown in FIG. 2, the capcoat layer may be fully cured in heating zone 27, since an uncured precoat layer is applied thereto.

In the embodiment illustrated in FIG. 1, the precoat layer is applied to a substrate 1 which is moved past mixing head 7 and subsequent doctor blade 10 (or a similar device) using a conveyor belt 11. The substrate is on an adjustable bed plate 12 which can be adjusted together with the doctor blade 10 to provide an uncured precoat layer 2 which is of a desired thickness and securely bonded to substrate 1. Excess urethane reaction mixture 8 is also removed by the doctor blade 10. It is understood that other means for applying the urethane reaction mixture, forming it into a precoat layer and moving the substrate through these operations may also be employed herein. Such means are advantageously selected to minimize mechanically induced stress in the substrate.

In FIG. 1, the precoated substrate 9 is then passed through a heating zone 14 where the precoat layer is a partially or completely cured. At least one of the capcoat and precoat layers is only partially cured when the layers are laminated. The temperature employed and the residence time of the precoated substrate 9 in a heating zone 14 is such that the precoat layer 2 is cured as required. In this step, a conveyor belt 11 or similar device is preferably employed to transport the precoated substrate 9 in order to permit the precoated substrate 9 to lay flat during this curing step. This minimizes mechanically induced stress in the precoated substrate 9 once the precoat is cured.

In FIG. 2, the precoat layer is deposited directly onto the previously-formed capcoat layer. Excess precoat reaction mixture is removed using doctor blade 10 or a similar device. No curing of the precoat layer prior to its lamination to the substrate is illustrated in FIG. 2. Partial curing of this layer may be performed prior to attachment to the substrate, but such curing must not progress to a tack-free state.

The lamination step is done under conditions which minimize the mechanical stress to which the components are subjected. A conveyor belt 30 is advantageously employed as a means for transporting the capcoat through the lamination step and subsequent operations. Such conveyor belt permits the coated substrate to lay flat, thereby minimizing the mechanical stress exerted thereon.

In addition, the substrate 1 is advantageously at an elevated temperature during the final lamination step. Heating of said substrate 1 may be conducted at heating zone 14 in the preparation of the precoated substrate 9 (FIG. 1) or by a separate heating zone (not shown) situated immediately before the point of lamination of the substrate to the precoated capcoat (FIG. 2). Such preheating releases stress in the substrate, thereby providing for a backed product with improved dimensional stability. Such preheating is advantageously conducted at a temperature of about 85° to about 25° F. (30°–121° C.).

The final lamination step is conducted under sufficient pressure to obtain good bonding between the capcoat, precoat and substrate. A foam blanket 32, multiple pressure rollers with a belt as a tractor (not shown) or other mechanical means is employed to exert such pressure.

Following or simultaneous with the final lamination step the curing of capcoat layer 26 and precoat layer 2 is completed as necessary. The final curing of the capcoat may be accomplished by the introduction of a heating zone 41 after the lamination step. However, in many instances one or both of the polymer layers is still hot from previous curing steps when the final lamination step is performed. In such case, final curing of the layers can occur during or immediately following the final lamination step.

The capcoated substrate 35 is then cooled prior to cutting, rolling up or other subsequent handling. A separate cooling zone 33 as illustrated in the Figures may be employed, but often cooling at room temperature is sufficient. The capcoated substrate 35 is cooled to a temperature of about 20 to 100, preferably 60° to 90° F. before subsequent rolling up or mechanical handling.

Figure 3:
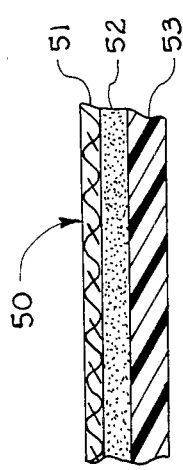
FIG. 3 is a cross-sectional view of a polymer-backed substrate according to this invention.

Referring to FIG. 3, the product article comprises a layered structure 50 comprising a substrate 51, a precoat polymer layer 52 bonded to said substrate, and a capcoat polymer layer 53 bonded to said precoat layer. In the preparation of a polymer backed carpet according to a preferred embodiment of this invention, the precoat layer 52 advantageously weighs about 5 to 65, more preferably 10 to 40 ounces per square yard (oz/yd$^2$). The capcoat 53 in the preferred embodiment advantageously weighs from about 20 to 100, more preferably 30 to 70 ounces per square yard.

A polymer backed carpet prepared according to this invention exhibits excellent stability as determined by the AACHEN Stability Test. As such, it is especially suitable for use as carpet tile and employed in free lay grid or total glue down carpet installations. However, the improved stability of this carpet renders it useful in broadloom carpeting as well. Other textiles formed according to the invention also exhibit excellent dimensional stability.

The following examples are provided to illustrate the invention but not to limit the scope thereof. All parts and percentages are by weight unless otherwise indicated.

EXAMPLE 1

In this example a polyurethane backed carpet is prepared using as a substrate a commercially available 40 oz/yd$^2$ carpet having a polyester reinforced woven polypropylene primary and a 1/10" gauge cut nylon pile. To the substrate is applied, via a doctor blade, 25 ounces per square yard of a precoat reaction mixture comprising:

| | |
|---|---|
| 200 MW polypropylene glycol | 85 |
| dipropylene glycol | 15 |
| Aluminum trihydrate | 100 |
| Calcium carbonate | 105 |
| Catalyst | 1 |
| Surfactant | 0.125 |
| Toluenediisocyanate/dipropylene glycol prepolymer (% NCO = 28) | 57.5 |

In preparing the precoat reaction mixture, all components except the isocyanate are blended and the water is removed by heating at about 200° F. for about 30 minutes under vacuum. After cooling to 90° F., the isocyanate is blended therewith and the resulting reaction mixture is applied to the substrate.

The precoated carpet is then transported to a forced air oven at about 250° F. for about 8.5 to 10 minutes in order to cure the precoat.

Independently, on a conveyor belt which has been coated with a latex slip coat, a capcoat reaction mixture is formed into a 75 oz/yd² capcoat layer. The capcoat reaction mixture comprises:

| Component | Parts by Weight |
|---|---|
| 4800 MW EO-capped polypropylene glycol | 49 |
| 4800 MW poly (EO/PO) triol | 46 |
| N,N—diisopropanol aniline | 3 |
| 1,4-butanediol | 1 |
| Catalyst | 0.5 |
| Triethanolamine | 1 |
| Aluminum trihydrate | 100 |
| Calcium carbonate | 100 |
| Pigment | 0.45 |
| diphenylmethane diisocyanate | 19.2 |

A fixed gap blade mechanism is used to control the thickness of the capcoat layer. Upon forming the capcoat layer, the conveyor belt passes over plate coils at a temperature of 200° to 300° F. to begin curing the capcoat layer. Curing proceeds until the capcoat layer is sufficiently cured that when contacted with a metal spatula, polymer strings form when the spatula is pulled away. At this point the precoated substrate is laminated to the partially cured capcoat layer. Lamination takes place under a urethane foam blanket to which pressure is applied from above. After lamination, the conveyor belt transports the urethane backed carpet over several water cooled plate coils to cool the carpet to approximately room temperature before rolling up.

Sections of the resulting polyurethane backed carpet are cut into 18" squares for testing for dimensional stability according to the AACHEN test. The dimensions of such a square tile are measured. The tile is first placed into an oven at 140° F. for 2 hours and the dimensions measured. The tile is then submerged in water containing 0.1% detergent for 2 hours at 20° C. and again measured. The tile is then placed into an oven at 140° F. for 24 hours and measured. The tile is then maintained at room temperature for 48 hours and measured. The dimensions after each test are reported as a percentage of the original dimensions in the following table.

TABLE I

| AACHEN Stability Testing: Sample No. 1 | | |
|---|---|---|
| Condition | % Change Length | % Change Width |
| 2 hr @ 140° F. | −0.08% | +0.01% |
| 2 hr water immersion | −0.07% | +0.03% |
| 24 hr @ 140° F. | −0.08% | +0.02% |
| 48 hr @ R.T. | −0.08% | +0.01% |

A dimensional change of less than 0.1% is considered commercially acceptable.

Comparative Sample No. C-1 is prepared in like manner except that instead of cooling the urethane polymer backed carpet before rolling up, the carpet is rolled while still warm from the cap coating operation. The dimensional stability of a tile cut from this comparative sample is determined according to the AACHEN test with the results as indicated in Table II following:

TABLE II

| AACHEN Stability Testing Comparative Sample No. 1 | | |
|---|---|---|
| Condition | % Change Length | % Change Width |
| 2 hr @ 140° F. | −0.034% | −0.168% |
| 2 hr water immersion | −0.309% | +0.109% |
| 24 hr @ 140° F. | −0.176% | −0.411% |
| 48 hr @ R.T. | −0.150% | −0.260% |

None of the comparative carpet tiles passes the AACHEN dimensional stability test.

What is claimed is:

1. A process for preparing a substrate backed with a polymer derived from an organic polyisocyanate, said process comprising the steps of
   (a) forming a precoat layer of a precoat reaction mixture comprising a substantially difunctional polyahl and a substantially difunctional organic polyisocyanate,
   (b) separately forming a capcoat layer of a capcoat reaction mixture comprising a polyahl and a polyisocyanate,
   (c) contacting said precoat layer with one surface of said substrate before said precoat layer is cured to a tack-free state,
   (d) contacting said capcoat layer with one surface of said precoat layer before at least one of said precoat layer and capcoat layer is cured to a tack-free state,
   (e) completing curing said capcoat and precoat layer, and
   (f) cooling the resulting polymer-backed substrate to a temperature less than about 35° C. before any mechanical distortion thereof, wherein steps (a)–(f) are carried out under conditions such that mechanically induced stress in the substrate, precoat layer and capcoat layer is minimized.

2. The process of claim 1 wherein precoat layer is contacted with said substrate before said capcoat and precoat layers are contacted.

3. The process of claim 2 wherein said precoat layer is at a temperature of about 35° to 75° C. when step (d) is conducted.

4. The process of claim 2 wherein the capcoat layer is formed and partially cured on a conveyor belt prior to conducting step (d).

5. The process of claim 4 wherein the partially cured capcoat layer is laminated to the precoated substrate on a conveyor belt under a foam blanket.

6. The process of claim 1 wherein said precoat and capcoat layers are contacted before said precoat layer is contacted with the substrate.

7. The process of claim 1 wherein the precoat reaction mixture comprises a polyahl mixture comprising a major portion of a relatively high molecular weight polyol and a minor portion of low molecular weight diol.

8. The process of claim 7 wherein the precoat reaction mixture comprises a substantially difunctional organic polyisocyanate which is a prepolymer of an excess of an organic diisocyanate and a relatively low molecular weight diol.

9. The process of claim 8 wherein the precoat reaction mixture comprises from about 150–500 parts by weight of an inorganic filler per 100 parts by weight of polyahl mixture.

10. The process of claim 1 wherein the capcoat reaction mixture comprises a polyahl mixture comprising a relatively high molecular weight diol, a relatively high molecular weight triol, and at least one low molecular weight polyol.

11. The process of claim 10 wherein the capcoat reaction mixture comprises from about 100–500 parts by weight inorganic filler per 100 parts by weight polyahl mixture.

12. The process of claim 1 wherein the precoat layer weighs about 10 to 30 oz/yd$^2$.

13. The process of claim 12 wherein the capcoat layer weighs about 30 to 70 oz/yd$^2$.

14. The process of claim 1 wherein a scrim is inserted between the substrate and precoat layer and/or between the precoat and capcoat layer.

15. The process of claim 1 wherein the substrate is a carpet.

16. The process of claim 15 wherein the substrate is a broadloom carpet.

17. The process of claim 24 comprising the additional step of (g) cutting the polymer-backed substrate into carpet tiles after the polymer-backed substrate is cooled to a temperature less than about 35° C.

18. A process for preparing a substrate-backed with a polymer, said process comprising the steps of (a) forming a precoat layer of a precoat reaction mixture comprising a curable linear polymerforming composition, (b) separately forming a capcoat layer of a capcoat reaction mixture comprising a curable polymer-forming composition, (c) contacting said precoat layer with one surface of said substrate before said precoat layer is cured to a tack-free state, (d) contacting said capcoat layer with one surface of said precoat layer before at least one of said precoat layer and capcoat layer is cured to a tack-free state, (e) completing curing said capcoat and precoat layer, and (f) cooling the resulting polymer-backed substrate to a temperature less than about 35° C. before any mechanical distortion thereof, wherein steps (a)–(f) are carried out under conditions such that mechanically induced stress in the substrate, precoat layer and capcoat layer is minimized.

* * * * *

UNITED STATES PATENT AND TRADEMARK OFFICE
CERTIFICATE OF CORRECTION

PATENT NO. : 4,657,790

DATED : April 14, 1987

INVENTOR(S) : Phillip L. Wing et al.

It is certified that error appears in the above-identified patent and that said Letters Patent is hereby corrected as shown below:

Column 7, line 28, "layer is a" should read --layer is--.

Column 10, line 45, Claim "3" should read Claim --4--.

Column 10, line 48, Claim "4" should read Claim --10--.

Column 10, line 51, Claim "5" should read Claim --11--.

Column 10, line 54, Claim "6" should read Claim --3--.

Column 10, line 57, Claim "7" should read Claim --5--.

Column 10, line 62, Claim "8" should read Claim --6--.

Column 10, line 67, Claim "9" should read Claim --7--.

Column 11, line 3, Claim "10" should read Claim --8--.

Column 11, line 8, Claim "11" should read Claim --9--.

Column 11, line 25, "24" should read --16--.

Signed and Sealed this

Nineteenth Day of January, 1988

*Attest:*

DONALD J. QUIGG

*Attesting Officer*    *Commissioner of Patents and Trademarks*